(12) United States Patent
Morishima (10) Patent No.: US 11,994,721 B2
(45) Date of Patent: May 28, 2024

(54) METHOD FOR MANUFACTURING OPTICAL CONNECTOR

(71) Applicant: SUMITOMO ELECTRIC INDUSTRIES, LTD., Osaka (JP)

(72) Inventor: Tetsu Morishima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 884 days.

(21) Appl. No.: 17/081,635

(22) Filed: Oct. 27, 2020

(65) Prior Publication Data

US 2021/0041633 A1 Feb. 11, 2021

Related U.S. Application Data

(63) Continuation of application No. PCT/JP2019/048546, filed on Dec. 11, 2019.

(30) Foreign Application Priority Data

Jan. 8, 2019 (JP) .................................. 2019-001154

(51) Int. Cl.
*G02B 6/38* (2006.01)
*C03C 25/005* (2018.01)

(52) U.S. Cl.
CPC .......... *G02B 6/3843* (2013.01); *C03C 25/005* (2013.01); *G02B 6/3863* (2013.01)

(58) Field of Classification Search
None
See application file for complete search history.

(56) References Cited

U.S. PATENT DOCUMENTS

| | | |
|---|---|---|
| 2002/0129623 A1 | 9/2002 | Nonomura et al. |
| 2004/0175091 A1 | 9/2004 | Nonomura et al. |
| 2014/0010501 A1 | 1/2014 | Saito et al. |
| 2015/0355416 A1* | 12/2015 | Liu ........................ B24B 49/02 |
| | | 451/6 |
| 2016/0252684 A1 | 9/2016 | Bradley |
| 2017/0031110 A1 | 2/2017 | Bhagavatula et al. |
| 2017/0176692 A1* | 6/2017 | Gregorski ............ G02B 6/3834 |
| 2018/0329156 A1* | 11/2018 | Flaig ................. H01J 37/32009 |

(Continued)

FOREIGN PATENT DOCUMENTS

| | | | |
|---|---|---|---|
| GB | 2105062 A * | 3/1983 | ........... G02B 6/3843 |
| JP | 2000-009963 A | 1/2000 | |
| JP | 2002-267880 A | 9/2002 | |

(Continued)

*Primary Examiner* — Lisa L Herring
(74) *Attorney, Agent, or Firm* — Oliff PLC (57) ABSTRACT

Provided is a method for manufacturing an optical connector. The optical connector includes: an optical fiber including a glass fiber and a resin coating; and a ferrule including a through hole. The method for manufacturing includes: coating an inner wall of the through hole with a thermosetting resin; inserting the glass fiber exposed from the resin coating into the through hole; adjusting a mutual positional relationship between the optical fiber and the ferrule so that a distance between end surfaces of a tip of the glass fiber and a tip of the ferrule is equal to or less than 1 mm; rotationally aligning the glass fiber with respect to the ferrule; curing the thermosetting resin; and polishing the tip of the glass fiber and the tip of the ferrule.

6 Claims, 6 Drawing Sheets

(56) References Cited

U.S. PATENT DOCUMENTS

2019/0072725 A1    3/2019   Watanabe et al.

FOREIGN PATENT DOCUMENTS

| JP | 2005-062338 A | 3/2005 | | |
|---|---|---|---|---|
| JP | 2013-238692 A | 11/2013 | | |
| JP | 2015-145989 A | 8/2015 | | |
| JP | 2017-173512 A | 9/2017 | | |
| JP | 2018-028638 A | 2/2018 | | |
| WO | WO-2012098456 A1 * | 7/2012 | ........... | G02B 6/4296 |
| WO | 2012/121320 A1 | 9/2012 | | |
| WO | 2013/172322 A1 | 11/2013 | | |

* cited by examiner

METHOD FOR MANUFACTURING OPTICAL CONNECTOR

CROSS-REFERENCE TO RELATED APPLICATION(S)

This application is a continuation of PCT application No. PCT/JP19/048546, which was filed on Dec. 11, 2019 based on Japanese Patent Application No. 2019-001154 filed on Jan. 8, 2019, the contents of which are incorporated herein by reference.

TECHNICAL FIELD

The present disclosure relates to a method for manufacturing an optical connector.

BACKGROUND ART

Construction of an optical network makes a progress in order to cope with increase in communication speed and increase in amount of information by the spread of information communication such as the Internet and also bidirectional communication and large-capacity communication. As a method for increasing a transmission capacity of an optical fiber, for example, a multi-core fiber (hereinafter, referred to as an "MCF") including a plurality of cores is proposed. When the optical network is constructed with the MCF, an optical connector for easily splicing the MCF is required. At that time, in order to splice all the cores of the MCF, it is required to rotate the MCF around its central axis to align a position of the MCF in a rotation direction (rotationally align).

Patent Literature 1 discloses a manufacturing method including rotational alignment of the optical connector for splicing the MCF. In this manufacturing method, first, the MCF fixed to a ferrule is arranged so that a master MCF faces a fixed master MCF connector, and center positions of the MCF fixed to the ferrule and the master MCF are aligned. Next, light is introduced into a core of one of the master MCF and the MCF, and the ferrule is rotated relative to the master MCF connector such that light is detected from a core of the other of the master MCF and the MCF, and the ferrule is held at a position where light intensity is maximum. After that, a flange including a positioning mechanism is fixed to the ferrule of the MCF that is rotationally aligned.

CITATION LIST

Patent Literature

Patent Literature 1: JP-A-2013-238692

SUMMARY OF INVENTION

Solution to Problem

The present disclosure provides a method for manufacturing an optical connector that includes: an optical fiber including a glass fiber and a resin coating that covers the glass fiber, an end portion of the glass fiber being exposed from the resin coating; and a ferrule including a through hole and holding the optical fiber.

The method for manufacturing includes:
coating an inner wall of the through hole with a thermosetting resin;
inserting the glass fiber exposed from the resin coating into the through hole;
adjusting a mutual positional relationship between the optical fiber and the ferrule so that a distance between end surfaces of a tip of the glass fiber and a tip of the ferrule is equal to or less than 1 mm;
rotationally aligning the glass fiber with respect to the ferrule;
curing the thermosetting resin; and
polishing the tip of the glass fiber and the tip of the ferrule.

DESCRIPTION OF EMBODIMENTS

Description of Embodiments of the Present Disclosure

First, contents of the embodiments of the present disclosure will be listed and described.

(1) Provided is a method for manufacturing an optical connector that includes: an optical fiber including a glass fiber and a resin coating that covers the glass fiber, an end portion of the glass fiber being exposed from the resin coating; and a ferrule including a through hole and holding the optical fiber. The method for manufacturing includes: coating an inner wall of the through hole with a thermosetting resin; inserting the glass fiber exposed from the resin coating into the through hole; adjusting a mutual positional relationship between the optical fiber and the ferrule so that a distance between end surfaces of a tip of the glass fiber and a tip of the ferrule is equal to or less than 1 mm; rotationally aligning the glass fiber with respect to the ferrule; curing the thermosetting resin; and polishing the tip of the glass fiber and the tip of the ferrule.

Accordingly, it is possible to obtain an optical connector in which a change in a core position of the optical fiber at an end surface of the optical connector is small between the time of the thermosetting adhesion and after the polishing, and a splicing loss is small.

(2) The method for manufacturing may further include measuring the distance between the end surfaces of the tip of the glass fiber and the tip of the ferrule.

(3) The adjusting of the mutual positional relationship between the optical fiber and the ferrule may include adjusting the mutual positional relationship between the optical fiber and the ferrule so that a part of the glass fiber exposed from the resin coating protrudes from the tip of the ferrule.

(4) The adjusting of the mutual positional relationship between the optical fiber and the ferrule may include adjusting the mutual positional relationship between the optical fiber and the ferrule so that the tip of the glass fiber exposed from the resin coating is positioned in the through hole and the distance between the end surfaces is less than 0.5 mm.

Accordingly, since a polishing amount of the glass fiber can be reduced, the change in the core position of the optical fiber at the end surface of the optical connector can be surely reduced between the time of the thermosetting adhesion and after the polishing.

(5) In the polishing of the tip of the glass fiber and the tip of the ferrule, a length of polishing the glass fiber may be equal to or less than 1.5 mm.

(6) In the polishing of the tip of the glass fiber and the tip of the ferrule, the tip of the glass fiber and the tip of the ferrule may be polished so that a tip surface of the glass fiber and a tip surface of the ferrule are flush with each other.

(7) The optical fiber may be either a polarization maintaining optical fiber or a bundle fiber. Accordingly, in addition to a multi-core fiber, even in the case of using the polarization maintaining fiber and the bundle fiber, the change in the core position of the optical fiber at the end surface of the optical connector can be surely reduced between the time of the thermosetting adhesion and after the polishing.

Details of Embodiments of the Present Disclosure

Hereinafter, an embodiment of a method for manufacturing an optical connector according to the present disclosure will be described with reference to the drawings. The present invention is not limited to the following embodiment but is indicated by the scope of the claims, and is intended to include all the modifications within meanings equivalent to the scope of the claims and within the scope thereof. The present invention includes a combination of any embodiments as long as a plurality of embodiments can be combined with each other. In the following description, configurations denoted by the same reference signs even in different drawings are regarded as the same configurations, and the description thereof may be omitted.

Although the rotational alignment is performed after the MCF is fixed to the ferrule, and then the flange is fixed thereto in the manufacturing method disclosed in Patent Literature 1, there is a method in which the MCF is inserted into the ferrule including the flange, the MCF is rotated to perform the rotational alignment, and then the MCF is fixed to the ferrule. In this case, it is necessary to perform the rotational alignment so that the MCF forms a predetermined angle in an axial rotation direction with respect to the flange, and then, thermoset-adhere the MCF to the ferrule. As a method of the rotational alignment, for example, a method in which the MCF is inserted into the ferrule including the flange and then the MCF is thermally cured by rotating the MCF while observing an end surface of the MCF is considered.

Figure 8:
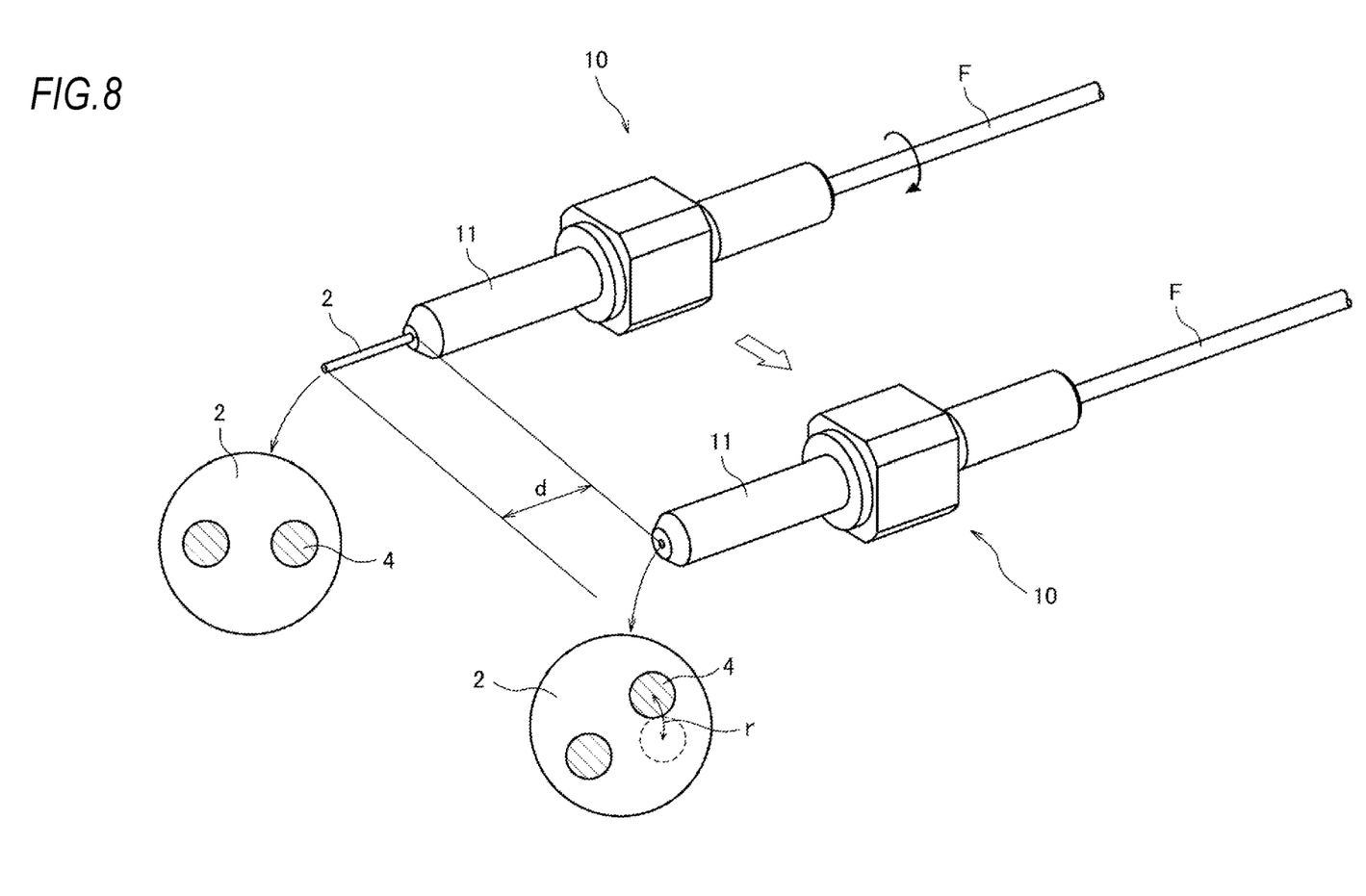
FIG. 8 is a diagram illustrating a state of an end surface of the optical fiber at the time of thermosetting adhesion and after polishing.

However, when the MCF is thermally cured and adhered to the ferrule and the next step such as polishing is performed after performing the rotational alignment in a state where a distance between end surfaces between an end surface of a glass fiber and an end surface of the ferrule is not controlled, a core position on an end surface of the connector after polishing may deviate from a core position on the end surface of the glass fiber at the time of the rotational alignment. FIG. 8 is a diagram illustrating a state of an end surface of an optical fiber at the time of thermosetting adhesion and after polishing. In FIG. 8, a position of a core 4 on an end surface of a glass fiber 2 of an optical fiber F at the time of the thermosetting adhesion after the rotational alignment, that is, the position of the core 4 on the end surface of the glass fiber 2 before polishing, and a position of the core 4 on an end surface of the optical fiber F after removing the glass fiber 2 protruding from a ferrule body 11 and polishing the glass fiber 2 together with the ferrule body 11 deviate by a deviation amount r. That is, FIG. 8 indicates that at a position of a length d from a tip of the glass fiber 2, the core deviates by the deviation amount r in comparison with the tip.

There are the following two reasons as a cause of the above-described deviation occurrence. One of the reasons is that the MCF is twisted in the ferrule because a clearance between a through hole for a fiber provided in the ferrule and the MCF is as small as less than 1 μm. Another reason is that fluctuation of the core position occurs inside the MCF due to a constant twist applied when the MCF is drawn.

An object of the present disclosure is to provide a method for manufacturing an optical connector having a low splicing loss, in the method for manufacturing the optical connector having an optical fiber whose core position is required to be controlled in a rotation direction of an axis.

Figure 1:
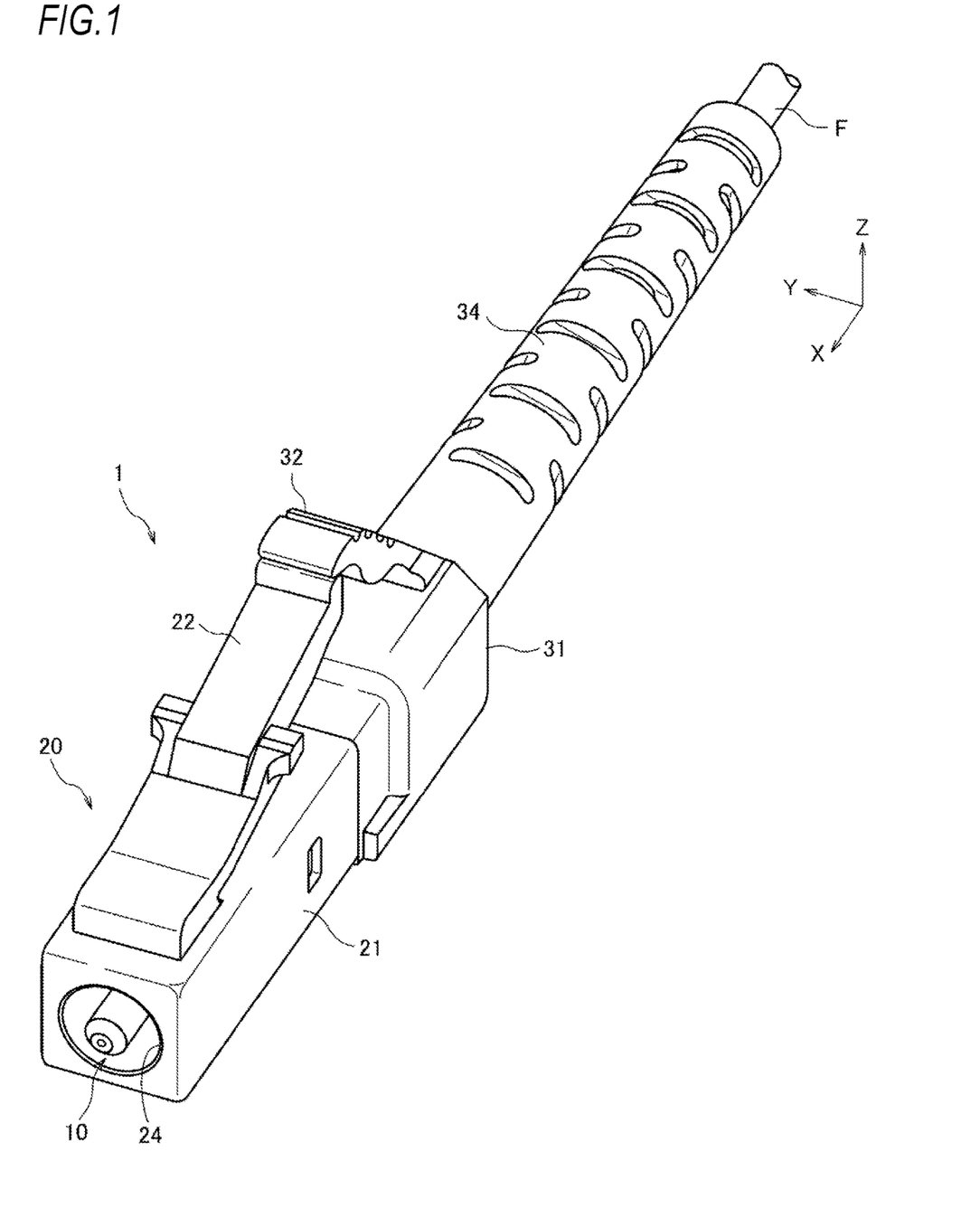
FIG. 1 is an external perspective view of an optical connector according to the present disclosure.
Figure 2:
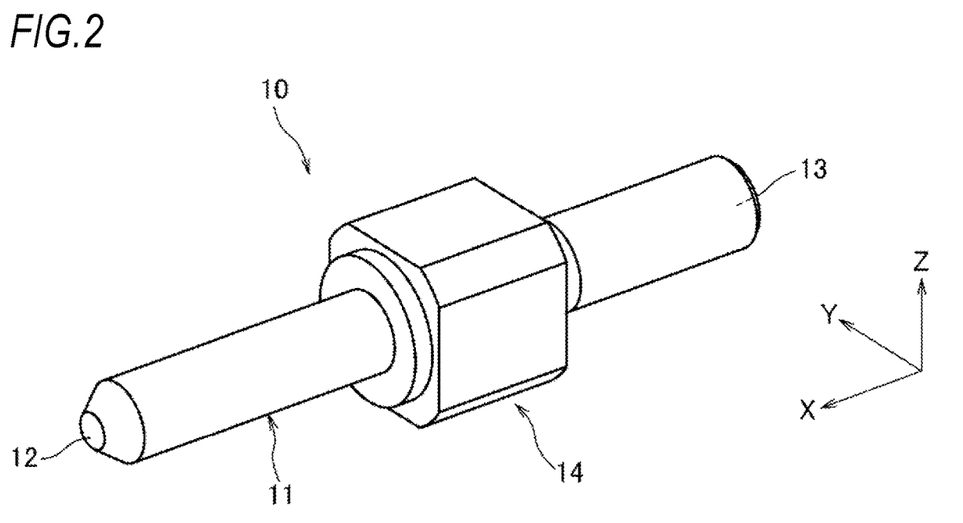
FIG. 2 is a perspective view of a ferrule of the optical connector of FIG. 1.
Figure 3:
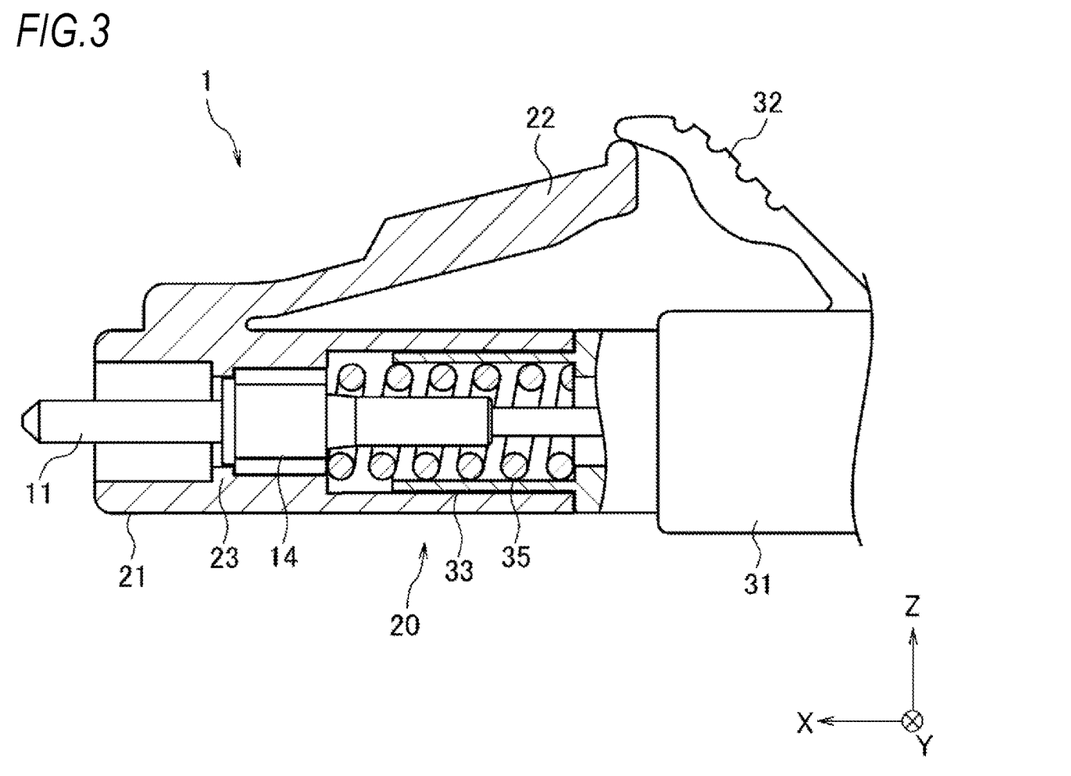
FIG. 3 is a cross-sectional view illustrating a state after the ferrule of FIG. 2 is housed in a plug frame.

FIG. 1 is an external perspective view of an optical connector 1 according to an aspect of the present disclosure, FIG. 2 is a perspective view of a ferrule 10 of the optical connector 1, and FIG. 3 is a cross-sectional view illustrating a state after the ferrule 10 is housed in a plug frame 20. In the following embodiments, an LC connector will be described as an example of the optical connector 1, but for example, the present invention can also be applied to other types of optical connectors including an SC connector and an MU connector.

The optical connector 1 includes the plug frame 20 that houses the ferrule 10, and a boot 34 that protects the optical fiber F is provided at a rear end of the plug frame 20. The ferrule 10 includes the ferrule body 11 extending in an X-axis direction illustrated in the drawing. The ferrule body 11 is, for example, a cylindrical component made of zirconia, and a through hole in the X-axis direction is provided inside the ferrule body 11 and holds a glass fiber exposed from a resin coating at a tip portion of the optical fiber F. The optical fiber F is, for example, the MCF including a plurality of cores, and is inserted from the side of a rear end 13 of the ferrule 10. A tip surface of the optical fiber F is exposed from a front end 12, and the optical fiber F is fixed to the ferrule 10 in a state where a plurality of cores are arranged at predetermined positions around a central axis of the ferrule 10. The X-axis direction illustrated in the drawing corresponds to an optical axis direction of the optical fiber F.

A metallic flange 14 is provided on the outside of an approximately central position of the ferrule body 11. In the embodiment, the flange 14 has an approximately quadrangular shape in a cross-sectional view, and a boundary position of each surface thereof is chamfered. The flange 14 has a function of positioning and fixing the ferrule 10 to the plug frame 20 on the basis of any one surface of the flange 14.

The plug frame 20 includes a polygonal tubular front housing 21 extending in the X-axis direction illustrated in the drawing. The front housing 21 is made of, for example, resin, and includes a rear end opening capable of receiving the ferrule 10 including the flange 14, and an opening 24 that allows the front end 12 of the ferrule body 11 to protrude. The front housing 21 has an approximately rectangular tubular shape in a cross-sectional view, and is formed so that the flange 14 of the ferrule 10 inserted into the front housing 21 can be positioned in a YZ direction. A positioning protrusion 23 abutting on a front end surface of the flange 14 is provided. A latch arm 22 having flexibility is provided on an outer peripheral surface of the front housing 21.

The plug frame 20 also includes a rear housing 31 behind the front housing 21. The rear housing 31 is made of, for example, resin, and includes a cylindrical spring housing portion 33 capable of housing a rear end portion of the ferrule 10 and a connector pressing spring 35. The connector pressing spring 35 is arranged at the rear of the ferrule 10, and can energize the ferrule 10 forward (positive direction of the X axis in the drawing, the same applies hereinafter) by abutting on a rear end surface of the flange 14. A clip 32 that can be engaged with the latch arm 22 is provided on an outer peripheral surface of the rear housing 31.

In order to assemble the optical connector 1, the rear end portion of the ferrule 10 and the connector pressing spring 35 are housed in the rear housing 31, and a tip portion of the ferrule 10 is inserted into the front housing 21. Next, when the clip 32 rides on the latch arm 22, the front housing 21 is latched to the rear housing 31. At the same time, the flange 14 is pushed forward by an energizing force of the connector pressing spring 35. As a result, since the front end surface of the flange 14 abuts on the positioning protrusion 23 of the front housing 21, the ferrule 10 is positioned in the X-axis direction. In this state, the flange 14 moves forward, and the tip portion of the ferrule 10 protrudes from the front housing 21.

Figure 4:
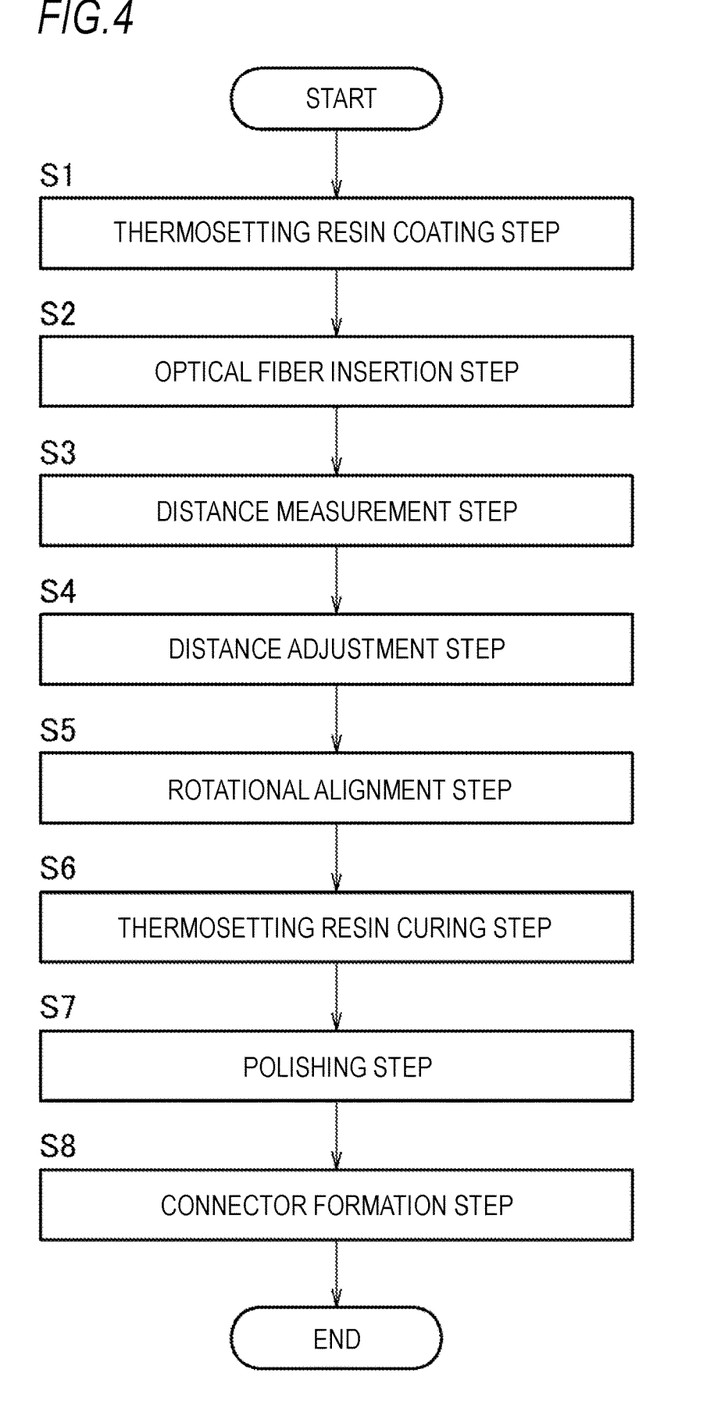
FIG. 4 is a flow chart illustrating a method for manufacturing the optical connector of the present disclosure.
Figure 5A:
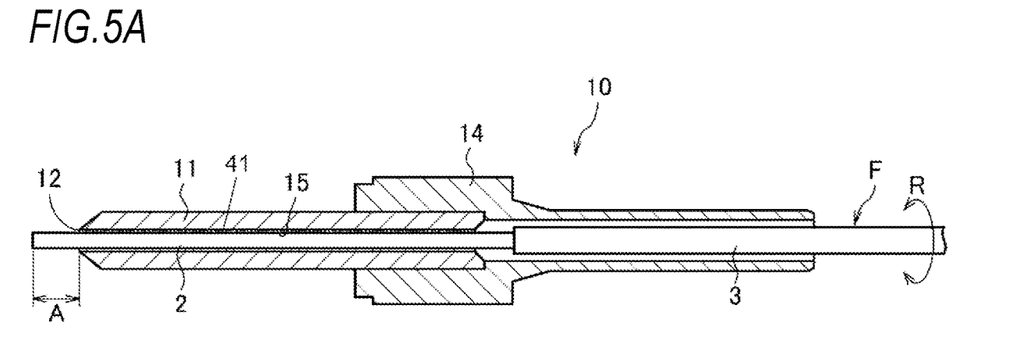
FIG. 5A is a diagram illustrating a step up to a thermosetting resin curing step in one method for manufacturing the optical connector of the present disclosure.
Figure 5B:
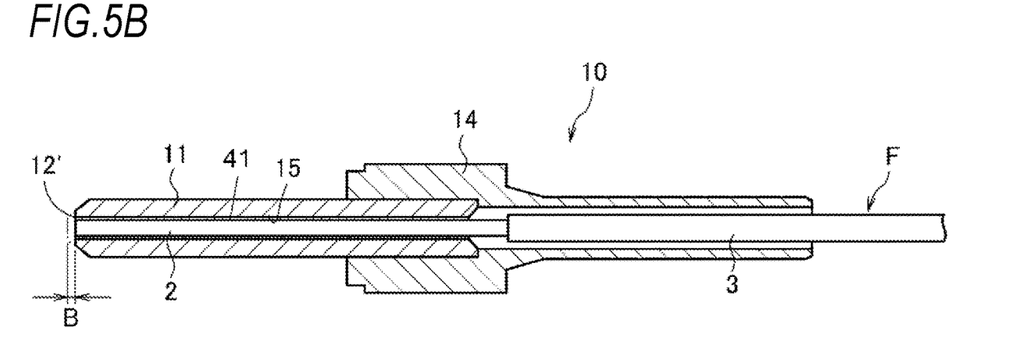
FIG. 5B is a diagram illustrating a state after performing a polishing step in the one method for manufacturing the optical connector of the present disclosure.

Next, a method for mounting the optical fiber F on the ferrule 10 will be described. FIG. 4 is a flowchart illustrating a method for manufacturing the optical connector 1. FIG. 5A is a diagram illustrating a step up to a thermosetting resin curing step in one method for manufacturing the optical connector 1, and FIG. 5B is a diagram illustrating a state after a polishing step in the one method for manufacturing the optical connector 1.

First, the ferrule 10 including the flange 14 is prepared, and an inner wall of a through hole 15 of the ferrule body 11 is coated with a thermosetting resin 41 (thermosetting resin coating step in step S1). Next, the tip of the glass fiber 2 is exposed by stripping a part of a resin coating 3, and the glass fiber 2 exposed from the resin coating 3 is inserted into the through hole 15 of the ferrule 10 from the rear end portion thereof (negative side in the X-axis direction) (optical fiber insertion step in step S2). Here, a clearance (gap) between the glass fiber 2 and the inner wall of the through hole 15 of the ferrule body 11 is approximately less than 1 μm.

Figure 6:
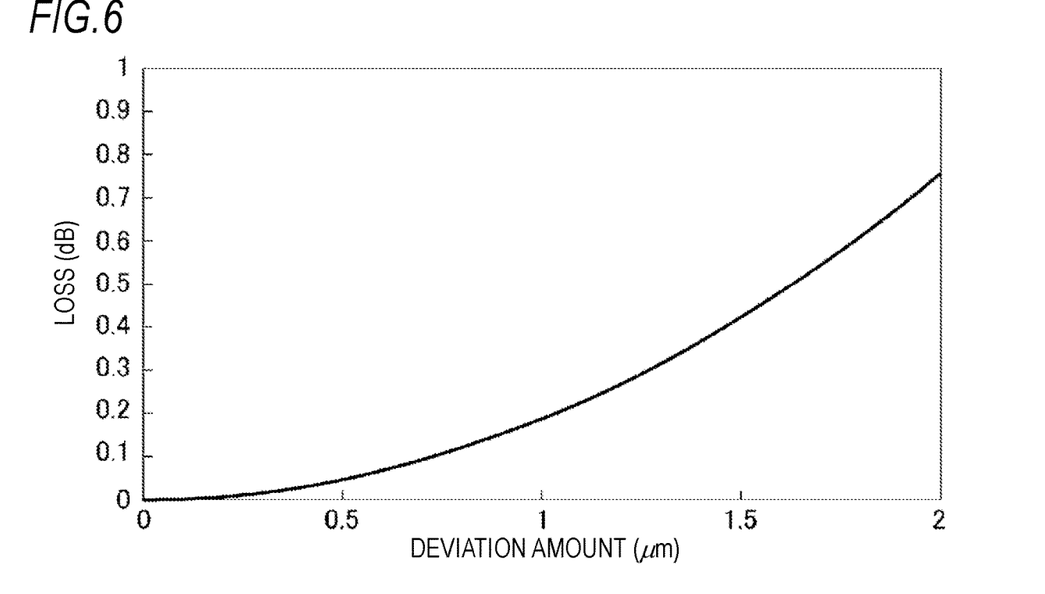
FIG. 6 is a diagram illustrating a relationship between a deviation amount of a core position of the optical fiber of the present disclosure and a splicing loss.

Next, a distance between the end surface of the glass fiber 2 and the end surface of the ferrule 10 (when the end surface of the glass fiber 2 protrudes from the end surface of the ferrule 10, the distance therebetween is referred to as a "protrusion length", and when the tip of the glass fiber 2 is positioned in the through hole 15, the distance therebetween is referred to as a "pull-in length") is measured (distance measurement step in step S3), and a mutual positional relationship between the optical fiber F and the ferrule 10 is adjusted so that the distance is equal to or less than 1 mm (distance adjustment step in step S4). FIG. 6 is a diagram illustrating a relationship between a deviation amount of a core position of the optical fiber F and a splicing loss. It is desirable to suppress the splicing loss to 0.5 dB or less, which is allowable in a product, and in this case, the deviation of the core position is required to be equal to or less than 1.6 μm from a graph of FIG. 6. When a longitudinal position of the end surface of the optical fiber F fluctuates by 2 mm, the core position may deviate by 1.6 μm, such that an amount of removal and polishing of the tip of the optical fiber F is required to be equal to or less than 2 mm, and desirably equal to or less than 1.5 mm.

Further, a polishing allowance B of the ferrule 10 to be polished together with the tip of the optical fiber is desirably equal to or less than 0.5 mm in order to maintain a product size of the ferrule 10. Therefore, as illustrated in FIG. 5A, a protrusion length A in which the glass fiber 2 protrudes from the front end 12 of the ferrule 10 (end surface at the tip portion) is desirably equal to or less than 1 mm. The tip of the glass fiber 2 may be adjusted so as to be in a state of being pulled in further than the front end 12 of the ferrule 10. In this case, the pull-in length is desirably less than 0.5 mm in consideration of the polishing allowance B of the ferrule 10.

When the glass fiber 2 protrudes from the tip of the ferrule 10, the protrusion length of a part of the glass fiber 2 protruding from the ferrule 10 corresponds to a distance between the tip of the glass fiber 2 and the tip of the ferrule 10 in the X-axis direction. Accordingly, the distance adjustment step shown in step S4 of FIG. 4 corresponds to the step of adjusting the distance between the tip of the glass fiber 2 and the tip of the ferrule 10 in the X-axis direction. On the other hand, when the tip of the glass fiber 2 is retracted from the tip of the ferrule 10 (in other words, when the tip of the glass fiber 2 is positioned in the through hole 15), a pull-in length of the glass fiber 2 corresponds to the distance between the tip of the glass fiber 2 and the tip of the ferrule 10 in the X-axis direction. Even in this case, in a similar manner, in step S3 of FIG. 4, the distance (pull-in length) between the tip of the glass fiber 2 and the tip of the ferrule 10 is measured, and the measured distance is adjusted in step S4.

In a related-art manufacturing method, there is a case in which when a protruding portion of the glass fiber 2 is cut, the remaining glass fiber 2 remains at the tip of the ferrule 10, and polishing is performed with polishing paper having a rough polishing particle in order to remove the remaining glass fiber 2. In this rough polishing, not only the glass fiber 2 but also the ferrule 10 is scraped off. On the other hand, in the embodiment, since the protrusion length of the glass fiber 2 protruding from the tip of the ferrule 10 is small, the rough polishing step can be shortened or omitted. Therefore, in the embodiment, it is possible to reduce a scraping amount of the ferrule 10.

After step S4, the processing proceeds to step S5, and the rotational alignment of the optical fiber F is performed (rotational alignment step in step S5). The rotational alignment is performed by rotating the glass fiber 2 in an arrow R direction with a predetermined surface on the outer peripheral side of the flange 14 as a reference surface, so that the glass fiber 2 at the tip portion becomes a predetermined rotation angle. As a specific method of the rotational alignment, for example, the method disclosed in Patent Literature 1 or various existing methods can be adopted.

After that, the ferrule 10 into which the optical fiber F is inserted is heated, and the thermosetting resin 41 in the ferrule body 11 is cured (thermosetting resin curing step in step S6). After step S6, as illustrated in FIG. 5B, an end surface of a tip portion of the glass fiber 2 and an end surface of a tip portion of the ferrule body 11 are polished (polishing step in step S7). The polishing amount of the glass fiber 2 in the polishing step is longer than the protrusion length A of the glass fiber 2 protruding from the end surface of the tip portion of the ferrule 10 and shorter than a length obtained by adding the protrusion length A and the polishing allowance B. In the polishing step, for example, the tip of the glass fiber 2 and the tip of the ferrule 10 are polished to be flush with each other. With respect to a longitudinal direction of the glass fiber 2 (X-axis direction), a predetermined angle may be formed or polishing may be performed in a convex spherical shape. An axial polishing length of the ferrule body 11 is suppressed to be equal to or less than 0.5 mm as described above. After the polishing step, the tip surface of the ferrule body 11 becomes a polishing surface 12, and the ferrule body 11 becomes shorter than before polishing.

Next, the ferrule 10 on which the optical fiber F is mounted is combined with the plug frame 20 and the connector pressing spring 35, thereby obtaining the optical connector 1 (connector formation step in step S8). A method for assembling the connector is as described above.

In the embodiment described above, while the LC connector is described as an example of the optical connector, the present invention can also be applied to other types of optical connectors including the SC connector and the MU connector. While the optical fiber F is described as an example of the MCF, the optical fiber F of the present disclosure may be, for example, a polarization maintaining fiber or a bundle fiber. The MCF, the polarization maintaining fiber, and the bundle fiber are optical fibers that require adjustment of the rotation angle around the central axis when optically spliced.

Figure 7:
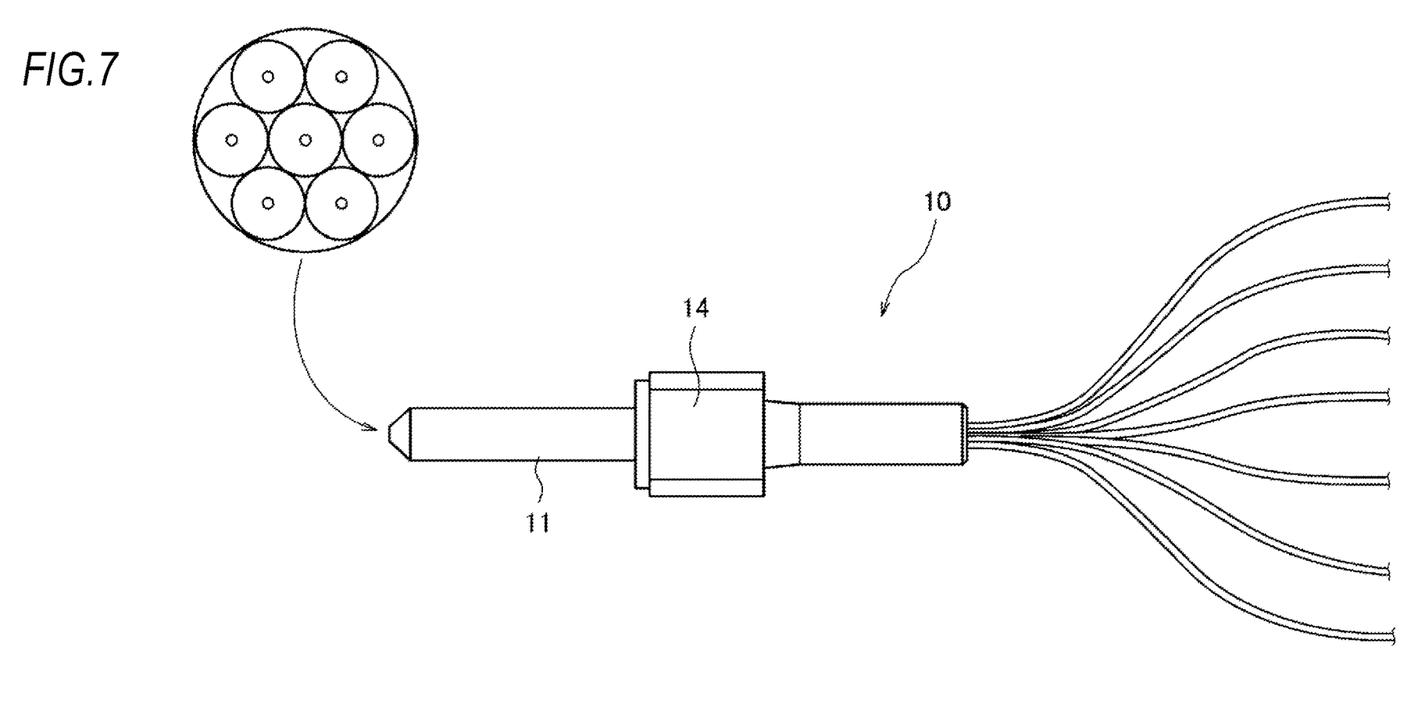
FIG. 7 is a diagram illustrating a bundle fiber.

The bundle fiber is a fiber in which a plurality of single-core fibers are collected for being optically spliced to the multi-core fiber. More specifically, for example, a tip of a single-core fiber having a glass diameter of 125 µm is chemically etched, thereby preparing a single-core fiber having a reduced glass diameter of, for example, 45 µm, and as illustrated in FIG. 7, a plurality of (for example, seven) pieces are put together with an adhesive and then inserted into the ferrule 10. In the case of this example, the plurality of pieces can be arranged so that a distance between the cores becomes 45 µm. As described above, in the disclosure, even when the multi-core fiber, the polarization maintaining fiber, and the bundle fiber are used as the optical fiber F, the optical fiber F can be surely positioned, thereby making it possible to prevent increase in the splicing loss of the optical connector 1.

REFERENCE SIGNS LIST

1: optical connector
2: glass fiber
3: resin coating
4: core
10: ferrule
11: ferrule body
12: front end
12: polishing surface
13: rear end
14: flange
20: plug frame
21: front housing
22: latch arm
23: positioning protrusion
24: opening
31: rear housing
32: clip
33: spring housing portion
34: boot
35: connector pressing spring
41: thermosetting resin

The invention claimed is:

1. A method for manufacturing an optical connector that includes: an optical fiber including a glass fiber and a resin coating that covers the glass fiber, an end portion of the glass fiber being exposed from the resin coating; and a ferrule including a through hole and holding the optical fiber, the method for manufacturing comprising:
  coating an inner wall of the through hole with a thermosetting resin;
  inserting the glass fiber exposed from the resin coating into the through hole;
  adjusting a mutual positional relationship between the optical fiber and the ferrule so that a distance between end surfaces of a tip of the glass fiber and a tip of the ferrule is equal to or less than 0.5 mm, and so that the tip of the glass fiber exposed from the resin coating is positioned inside the through hole;
  measuring the distance between the end surfaces of the tip of the glass fiber and the tip of the ferrule;
  rotationally aligning the glass fiber with respect to the ferrule;
  curing the thermosetting resin; and
  polishing the tip of the glass fiber and the tip of the ferrule.

2. The method for manufacturing the optical connector according to claim 1,
  wherein in the polishing of the tip of the glass fiber and the tip of the ferrule, a length of polishing the glass fiber is equal to or less than 1.5 mm.

3. The method for manufacturing the optical connector according to claim 1,
  wherein in the polishing of the tip of the glass fiber and the tip of the ferrule, the tip of the glass fiber and the tip of the ferrule are polished so that a tip surface of the glass fiber and a tip surface of the ferrule are flush with each other.

4. The method for manufacturing the optical connector according to claim 1,
  wherein the optical fiber is a multi-core optical fiber.

5. The method for manufacturing the optical connector according to claim 1,
  wherein the optical fiber is either a polarization maintaining optical fiber or a bundle fiber.

6. A method for manufacturing an optical connector that includes: an optical fiber including a glass fiber and a resin coating that covers the glass fiber, an end portion of the glass fiber being exposed from the resin coating; and a ferrule including a through hole and holding the optical fiber, the method for manufacturing comprising:
  coating an inner wall of the through hole with a thermosetting resin;
  inserting the glass fiber exposed from the resin coating into the through hole;
  adjusting a mutual positional relationship between the optical fiber and the ferrule so that a distance between end surfaces of a tip of the glass fiber and a tip of the ferrule is equal to or less than 1 mm;
  rotationally aligning the glass fiber with respect to the ferrule;
  curing the thermosetting resin; and
  polishing the tip of the glass fiber and the tip of the ferrule, wherein a length of polishing the glass fiber does not exceed 1.5 mm.

* * * * *